United States Patent [19]

Hitt

[11] Patent Number: 4,760,998

[45] Date of Patent: Aug. 2, 1988

[54] CLAMPING DEVICE

[76] Inventor: Dale Hitt, 20850 Westhaven, Southfield, Mich. 48075

[21] Appl. No.: 64,982

[22] Filed: Jun. 19, 1987

[51] Int. Cl.[4] .......... B23Q 3/02

[52] U.S. Cl. .......... 269/138

[58] Field of Search .......... 269/134–138, 269/91, 246

[56] References Cited

U.S. PATENT DOCUMENTS 2,373,384 4/1945 Cross et al. .......... 269/138

2,760,535 8/1956 Mertz .......... 269/137

FOREIGN PATENT DOCUMENTS 1502919 10/1970 Fed. Rep. of Germany ...... 269/135

OTHER PUBLICATIONS

American Machinist, "Add Springs to Fixture to get Downward Clamping", Feb. 4, 1952.

Production Tool Supply Co. Catalog #88-pp. D-335, D-579; D-581; D-586; and D-587.

*Primary Examiner*—Robert C. Watson

*Attorney, Agent, or Firm*—Harness, Dickey & Pierce

[57] ABSTRACT

A clamping device for securing and accurately positioning an item relative to a predetermined surface includes a laterally-extending fixed jaw and a laterally-extending movable jaw. A locating surface is fixed relative to the fixed jaw and extends transversely at a laterally rearward or inward position relative to the fixed and movable jaw surfaces, with the locating surface being engageable by the item to be clamped when the item is inserted between the jaw surfaces. A resilient biasing apparatus is included for resiliently biasing the movable jaw in a generally forward or outward lateral direction, and a clamping apparatus is positioned laterally inward or rearward of the locating surface. The clamping apparatus is selectively actuable for forcibly urging the movable jaw toward the fixed jaw in order to clamp the item therebetween, and for exerting a clamping force on the movable jaw at a lateral position rearward or inward of the locating surface. This arrangement forcibly urges the movable jaw and the item laterally rearwardly as the item is forcibly clamped between the jaws.

18 Claims, 3 Drawing Sheets

CLAMPING DEVICE

BACKGROUND AND SUMMARY OF THE INVENTION

The present invention relates generally to clamping devices for securely clamping and accurately positioning an item at a predetermined location relative to a predetermined surface. More particularly, in its preferred application, the present invention is especially well-suited for application to clamping devices for securely clamping and accurately positioning an item relative to a predetermined surface on a machining, forming, or other manufacturing apparatus.

When performing machining, forming, or other manufacturing operations on various parts, components, or other such workpieces, it is extremely important to accurately position and securely retain the item relative to the work station at which such operations are being performed. Frequently, when such workpieces are clamped, the forces exerted on the workpiece by the clamping apparatus tend to move the workpiece away from its required position relative to the work station, thereby introducing the possibility of errors or inaccuracies during the work operation. Even in apparatuses where the clamping device does not tend to move the workpiece out of its proper position, it is frequently difficult to assure the accurate positioning of the workpiece for precision machining, forming, or other required manufacturing operations.

In order to overcome the above-mentioned disadvantages, the present invention seeks to provide a clamping device that securely restrains a workpiece or other item at a predetermined location relative to a predetermined surface on a work station or other such apparatus, wherein the clamping forces exerted on the item by the clamping device tend to urge the item into the proper, accurate position relative to a predetermined surface. In accordance with the present invention, such a clamping device includes a body, preferably having a securing apparatus thereon for securing the clamping device to the predetermined surface at a fixed location. One of at least a pair of jaws is fixed relative to the body and includes a generally laterally-extending fixed jaw surface thereon. A movable jaw, which is preferably cantilevered laterally outwardly, is selectively movable toward and away from the fixed jaw and has a generally laterally-extending movable jaw surface thereon, preferably in a parallel relationship with the fixed jaw surface. A locating surface is fixed relative to the body and extends transversely at a generally laterally rearward or inward position relative to the fixed and movable jaw surfaces, with the locating surface being engageable by the item to be clamped when the item is inserted between the jaw surfaces.

The clamping device further preferably includes a resilient biasing means for resiliently biasing at least a portion of the movable jaw in a generally forward or outward lateral direction relative to the body. A clamping means is positioned laterally inwardly or rearwardly of the locating surface and is selectively actuable for forcibly urging the movable jaw toward the fixed jaw in order to forcibly clamp the item therebetween. The clamping means exerts a clamping force on the movable jaw at a lateral position generally rearward or inward relative to the locating surface in order to also forcibly urge at least a portion of the movable jaw laterally rearwardly as the item is forcibly clamped between the jaws after the movable jaw is moved into engagement with the item. The forcible clamping engagement of the movable jaw with the clamped item thereby tends to forcibly urge the item rearwardly against the locating surface in order to secure and accurately locate the clamped item at a predetermined location relative to the predetermined surface.

Other objects and structural and functional features of a clamping device according to the present invention are described in more detail below, with reference to the drawings and the appended claims.

DETAILED DESCRIPTION OF THE PREFERRED EMBODIMENTS

Figure 1:
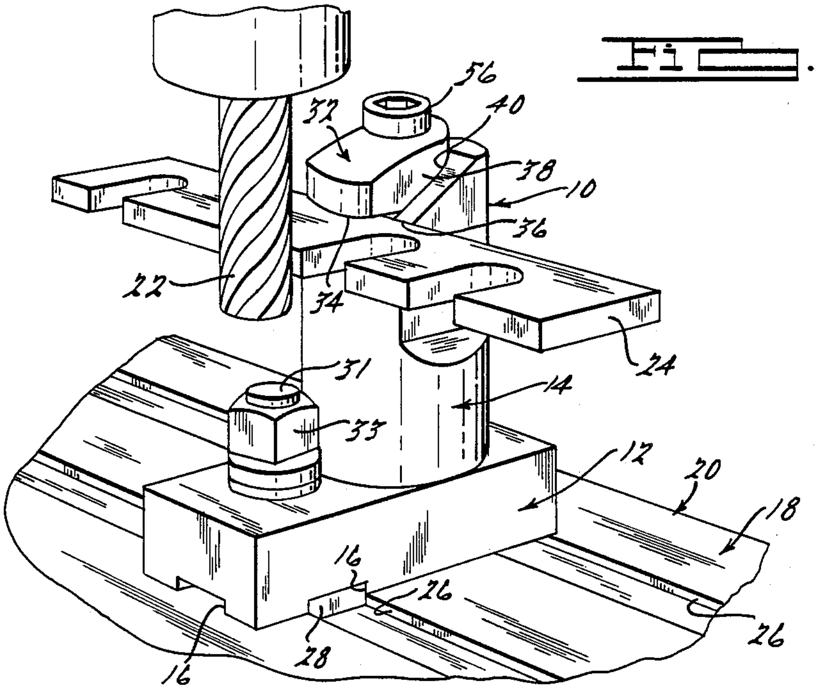
FIG. 1 is a perspective view of an exemplary clamping device according to the present invention, shown in connection with a machining apparatus for performing a machining operation on a workpiece or other such item.

FIGS. 1 through 7 illustrate exemplary embodiments and applications of a clamping device according to the present invention. One skilled in the art will readily recognize from the following discussion that the present invention is not limited to the particular clamping device structure shown for purposes of illustration in the drawings, and that the present invention is equally applicable to clamping or securing devices other than those used in machining or other such manufacturing operations.

Figure 2:
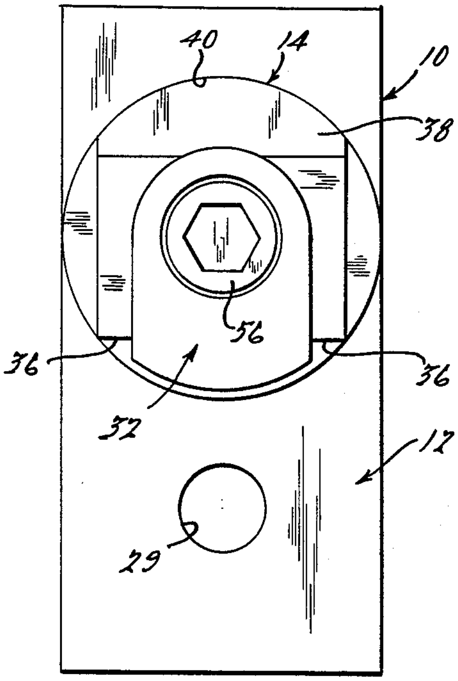
FIG. 2 is a top plan view of the exemplary clamping device of FIG. 1.
Figure 3:
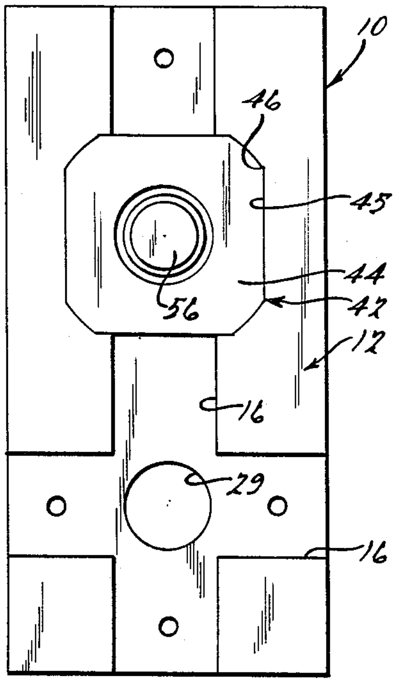
FIG. 3 is a bottom view of the exemplary clamping device of FIG. 1.

As shown in FIGS. 1 through 3, an exemplary clamping device 10 according to the present invention generally includes a base body portion 12 and an upper fixed body portion 14 securely fixed at a work table 18 of a machining apparatus 20 having a machining tool 22 associated therewith for performing a manufacturing operation on a workpiece 24 or other such item. Preferably, the base body portion 12 includes one or more slots or keyways 16 formed therein, with one or more slots or keyways 26 being formed in the work table 18, for receiving one or more keys or cleats 28 in an interlocking relationship with the slots 16 and with the slots 26 in order to fixedly position the clamping device 10 relative to the work table 18. Furthermore, the base portion 12 preferably includes a bore or opening 29 therein (shown in FIGS. 2 and 3) for receiving a bolt 31 or other suitable fastener, with a nut 33 threaded thereon, in order to securely anchor the clamping device 10 to the work table 18.

Figure 4:
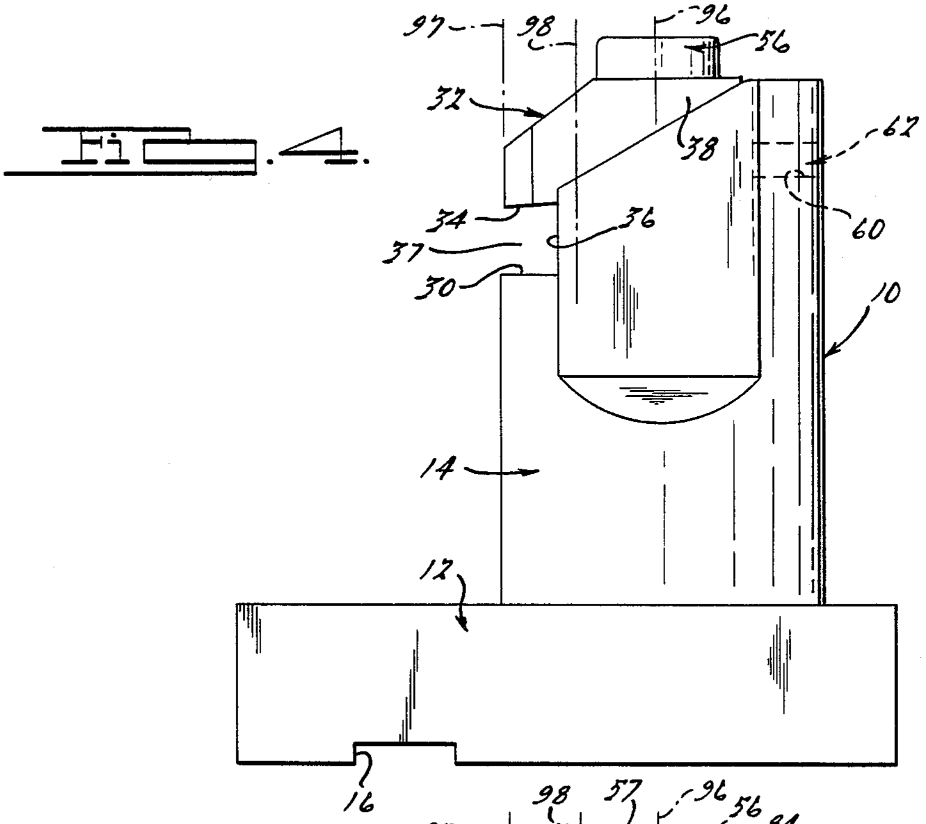
FIG. 4 is a side elevational view of the exemplary clamping device of FIG. 1.
Figure 5:
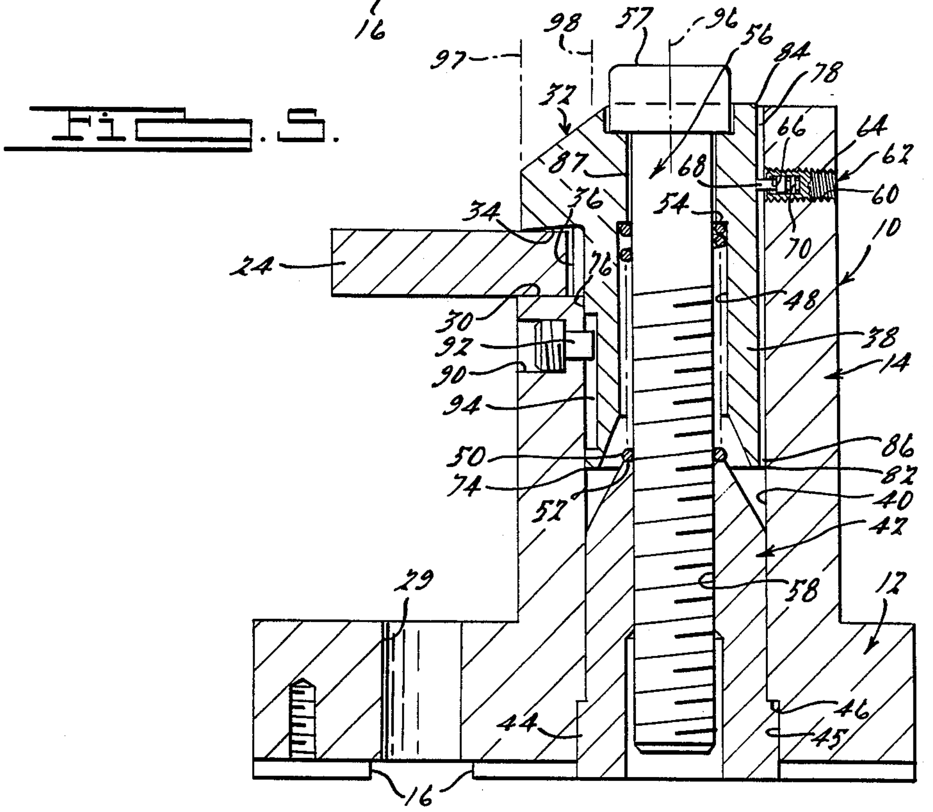
FIG. 5 is a longitudinal cross-sectional view of the exemplary clamping device of FIG. 1, shown with its jaws in initial contact or engagement with the item to be clamped.
Figure 6:
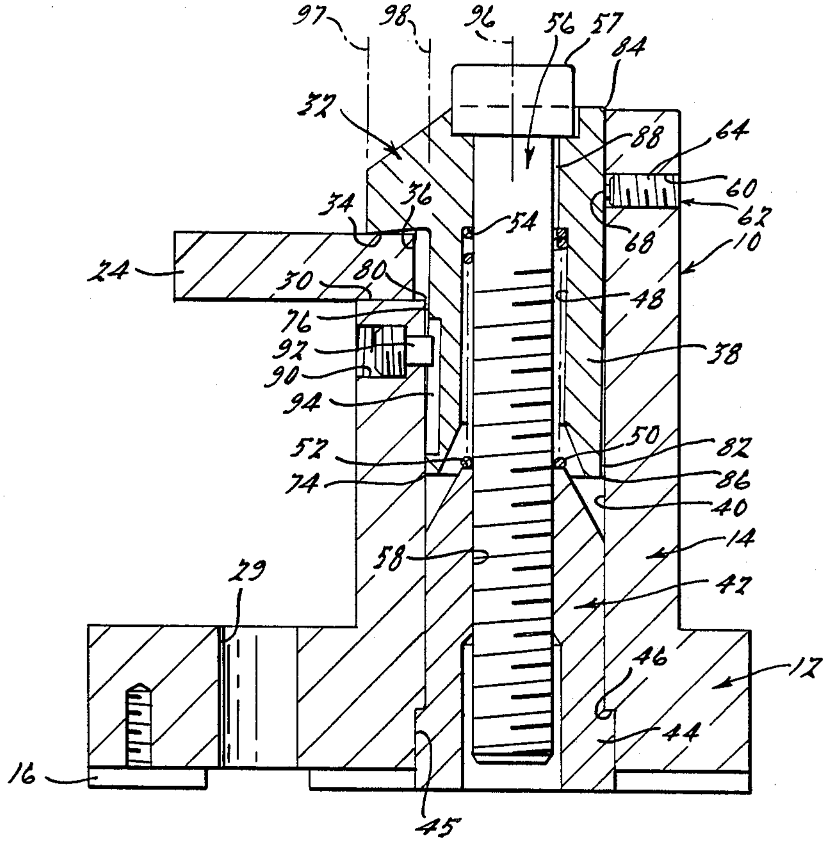
FIG. 6 is a longitudinal cross-sectional view similar to that of FIG. 5, but illustrating the jaws of the clamping device in a forcible clamping engagement with the item, and with the item in proper registration with a locating surface for accurately positioning the item relative to a predetermined surface on a machining apparatus.

As shown primarily in FIGS. 4 through 6, the clamping device 10 preferably includes a fixed jaw surface 30 forming a fixed jaw on the upper body portion 14, as well as a movable jaw 32, with a movable jaw surface 34 thereon, interconnected with, and preferably cantilevered laterally outwardly from, the upper body portion 14 for longitudinal movement toward an away from the fixed jaw surface 30. A fixed locating surface 36 extends transversely relative to the fixed and movable jaw surfaces 30 and 34, respectively, and is preferably disposed at a perpendicular relationship therewith and located laterally inward of the opening 37 between the jaw surfaces 30 and 34.

In order to accommodate the longitudinal movement of the movable jaw 32 relative to the upper body portion 14, the movable jaw 32 preferably includes a guide portion 38 slidably received within a bore or opening 40 in the upper body portion 14. A retainer 42 is also received within the opening 40 and preferably includes a rectangular retainer flange 44 or other enlarged portion thereon, which is received within a complementary rectangular recess 45 in the base body portion 12. The enlarged retainer flange 44 abuttingly engages a stepped or shoulder portion 46 generally surrounding the opening 40 in order to longitudinally and rotationally restrain the retainer 42 relative to the body of the clamping device 10.

A stepped bore or opening 48 is preferably formed within the guide portion 38 of the movable jaw 32 for receiving a threaded rod or screw 56 extending therethrough, with its head portion 57 abuttingly engaging the movable jaw 32. A rotatable threaded bore 58 is formed within the retainer 42 for threadably receiving the threaded rod 56, and preferably a spring 50 is compressed between a shoulder 52 on the retainer 42 and a shoulder 54 on the guide portion 38 in order to assist in moving the movable jaw 32 away from the fixed jaw surface 30 when the workpiece 24 is to be released.

A threaded bore 60 is preferably formed within the upper body portion 14, for threadably receiving a plunger assembly 62 therein. The plunger assembly 62, in the preferred embodiment of the invention, includes a threaded plunger body 64 having a plunger opening 66 therein, with a plunger 68 being restrained within the plunger opening 66 and spring-loaded or biased in a laterally outward direction by a plunger spring 70. The plunger 68 protrudes into the opening 40 in the upper body portion 14, preferably above at least the fixed jaw surface 30, and slidably engages the guide portion 38 of the movable jaw 32. By such an arrangement, the plunger 68 exerts a resilient lateral biasing force on the guide portion 38, tending to resiliently bias the guide portion 38, and thus the movable jaw 32, in a laterally forward or outward direction relative to the upper body portion 14. From the following discussion, one skilled in the art will readily recognize that other well-known resilient lateral biasing means can be used in lieu of the plunger assembly 62 shown for purposes of illustration in the drawings.

The arrangement described above preferably results in the configuration shown in FIG. 5, wherein a front lower edge 74 and a front upper edge 76 of the guide portion 38 are resiliently biased in a laterally forward or outward direction into contact with the inside of the bore 40. Because the lateral dimension or diameter of the opening 40 is larger than that of the guide portion 38, a relatively small amount of clearance is formed between the guide portion 38 and the inside of the opening 40, thus creating a relatively small gap 78 (shown in FIG. 5) between the rearward or inward upper edge 84 of the guide portion 38 and the rearward or inward side of the opening 40 prior to forcibly clamping the workpiece 24 between the jaw surfaces 30 and 34. A similar gap or clearance 86 also exists between the rear lower edge 82 of the guide portion 38 and the rearward or inward side of the opening 40. Similarly, because of clearance between the rod 56 and the inside of the stepped bore 48, a small clearance gap 87 is created between the rod 56 and the front side of the bore 48. Such gaps or clearances 78, 86 and 87 preferably exist at least until the movable jaw surface 34 is brought into initial contact with the workpiece 24, and the threaded rod 56 is rotated to forcibly clamp the workpiece 24 between fixed and movable jaw surfaces 30 and 34, respectively.

It should be noted that a small gap is shown in FIG. 5 between the workpiece 24 and the locating surface 36. This gap is shown in exaggerated form in FIG. 5, and may or may not actually exist when the workpiece 24 is inserted between the jaw surfaces 30 and 34. As discussed below, this small gap, if any, is taken up (as shown in FIG. 6) by the actuation of the clamping apparatus discussed below in order to assure an accurate positioning of the workpiece 24 against the locating surface 36.

Once the threaded rod 56 is rotated to forcibly urge the movable jaw 32 toward the fixed jaw surface 30, and to thus forcibly clamp and secure the workpiece 24 therebetween, as shown in FIG. 6, the clamping force exerted by the threaded rod 56 and threadable engagement with the retainer 42 tends to forcibly urge the movable jaw 32 in a laterally rearward or inward direction against the laterally outward biasing force of the spring-loaded plunger 68 to take up at least a portion of the clearance represented by the above-mentioned gaps 78, 86, and 87. The laterally rearward or inward force exerted on the guide portion 38 and the movable jaw 32, coupled with the clamping frictional engagement of the movable jaw surface 34 with the workpiece 24, tends to forcibly urge the workpiece 24 in a laterally rearward or inward direction into a tight abutting engagement with the locating surface 36, thereby assuring that the workpiece 24 is accurately positioned and securely restrained relative to the body of the clamping device, and thus relative to a predetermined location on the machining apparatus 20. As a result, the guide portion 38 tends to tilt or rock into the position shown in FIG. 6, wherein the gaps 78, 86, and 87 tend to be reduced or eliminated, and a gap 80 tends to form between the front upper edge 76 of the guide portion 38 and the front inner side of the bore 40. Similarly, a gap 88 tends to form between the rod 56 and the rearward side of the stepped bore 48.

The above-discussed laterally inward movement of the movable jaw surface 34 and the workpiece 24 is believed to be caused primarily by one or more moments formed as a result of the lateral distance between the centerline 96 of the rod 56 (along which the downward force on the guide portion 38 is exerted) and a plane 98 passing through the point or area of contact between the front lower edge 74 of the guide portion 38, as well as the lateral distance between the rod centerline 96 and a plane 97 passing through the point or area of contact between the movable jaw surface 34 and the workpiece 24. In this regard, the movable jaw surface 34 can be relieved or chamfered in a generally upward and rearward direction to accommodate the above-discussed lateral movement, or tilting of the guide portion 38 and the movable jaw 32.

In order to allow longitudinal and lateral movement of the guide portion 38, while rotationally restraining the guide portion 38 and the movable jaw 32 in proper alignment relative to the fixed jaw surface 30, the upper body portion 14 preferably includes a threaded bore 90, with a threaded pin 92 threadably received therein. A portion of the threaded pin 92 extends laterally into the opening 40 and is slidably received within a longitudinally elongated slot 94 formed within the guide portion 38.

Figure 7:
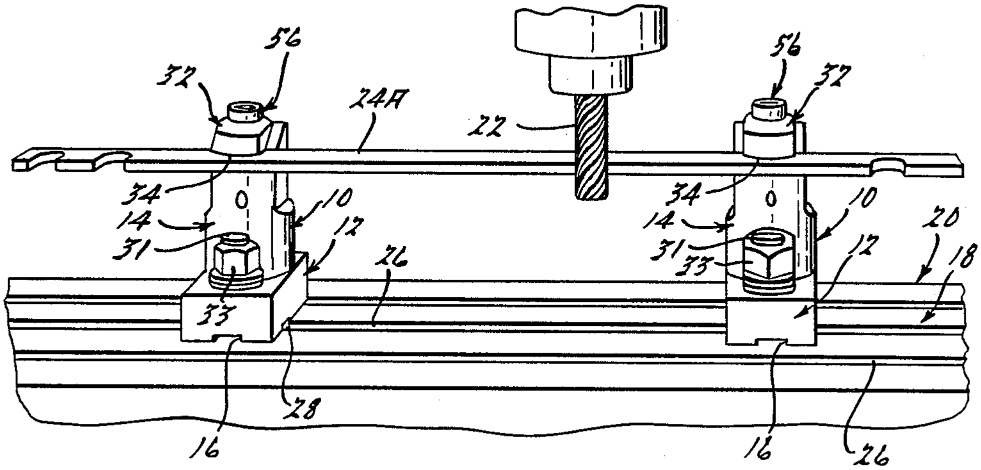
FIG. 7 illustrates a pair of the clamping devices of FIGS. 1 through 6 employed in an alternate arrangement, wherein a large item is required to be securely clamped and accurately positioned relative to the machining apparatus, thus requiring the use of more than one of the clamping devices according to the present invention.

As illustrated in FIG. 7, two or more of the clamping devices 10 can be used to securely retain and accurately position a large workpiece 24A relative to a predetermined surface on a machining or other apparatus 20. In such an arrangement, the user may find it advantageous to remove the plunger assembly 62 in some (perhaps in all but one) of the clamping devices 10 in order to effectively defeat or deactuate the resilient lateral biasing force exerted by the removed plunger assemblies. This may be found to be necessary in some applications in order to avoid possible inaccuracies resulting from one or more of the clamping devices 10 tending to move the workpiece 24A in opposing directions as the clamping devices are tightened into clamping engagement with respective portions of the workpiece 24A.

The foregoing discussion presents merely exemplary embodiments of the present invention. One skilled in the art will readily recognize from such discussion, taken in conjunction with the accompanying drawings and claims, that various modifications or component substitutions can be made without departing from the spirit and scope of the invention as defined in the following claims.

I claim:

1. A clamping device for clamping and accurately positioning an item at a predetermined location relative to a predetermined surface, said clamping device comprising:

a body including securing means for fixedly securing said body relative to said predetermined surface;

a fixed jaw fixed relative to said body, and a longitudinally movable jaw movable relative to said body in a generally longitudinal direction toward and away from said fixed jaw, said fixed and movable jaws having respective fixed and movable jaw surfaces extending in generally lateral outward directions and adapted for receiving and clampingly engaging the item therebetween;

a fixed locating surface fixed relative to said body and extending transversely at a generally laterally inward position between said fixed and movable jaw surfaces, said fixed locating surface being adapted to be abuttingly engaged by the item when the item is inserted laterally inwardly between said fixed and movable jaw surfaces;

resilient lateral biasing means for resiliently biasing said movable jaw in a generally outward lateral direction away from said fixed locating surface; and clamping means selectively actuable for forcibly urging said movable jaw in a generally longitudinal direction toward said fixed jaw into forcible clamping engagement with the item when the item is inserted between said fixed and movable jaws and for forcibly urging said movable jaw and the item in a generally laterally inward direction against the biasing force of said resilient lateral biasing means when the item is forcibly clamped between said jaws in order to forcibly urge the item laterally inwardly against said fixed locating surface and thereby accurately position the item relative to the predetermined surface, said body including a body opening extending generally longitudinally therethrough, said movable jaw having a guide portion thereon, said guide portion being slidably received in said body opening, and resilient longitudinal biasing means for resiliently biasing said movable jaw in a generally longitudinal direction away from said fixed jaw in order to urge said movable jaw away from said fixed jaw when said clamping means is deactuated.

2. A clamping device for clamping and accurately positioning an item at a predetermined location relative to a predetermined surface, said clamping device comprising:

a body including securing means for fixedly securing said body relative to said predetermined surface;

a fixed jaw fixed relative to said body, and a longitudinally movable jaw movable relative to said body in a generally longitudinal direction toward and away from said fixed jaw, said fixed and movable jaws having respective fixed and movable jaw surfaces extending in generally lateral outward directions and adapted for receiving and clampingly engaging the item therebetween;

a fixed locating surface fixed relative to said body and extending transversely at a generally laterally inward position between said fixed and movable jaw surfaces, said fixed locating surface being adapted to be abuttingly engaged by the item when the item is inserted laterally inwardly between said fixed and movable jaw surfaces;

resilient lateral biasing means for resiliently biasing said movable jaw in a generally outward lateral direction away from said fixed locating surface; and clamping means selectively actuable for forcibly urging said movable jaw in a generally longitudinal direction toward said fixed jaw into forcible clamping engagement with the item when the item is inserted between said fixed and movable jaws and for forcibly urging said movable jaw and the item in a generally laterally inward direction against the biasing force of said resilient lateral biasing means when the item is forcibly clamped between said jaws in order to forcibly urge the item laterally inwardly against said fixed locating surface and thereby accurately position the item relative to the predetermined surface, said body including a body opening extending generally longitudinally therethrough, said movable jaw having a guide portion thereon, said guide portion being slidably received in said body opening, said body opening sized to define a predetermined lateral clearance between said guide portion and said fixed body portion, said resilient lateral biasing means biasing said movable jaw laterally outwardly to take up at least a portion of said lateral clearance on a laterally outward side of said guide portion when the item is not forcibly clamped between said fixed and movable jaws, said clamping means being positioned for exerting a generally longitudinal clamping force on said guide portion of said movable jaw at a location laterally inward of said fixed and movable jaw surfaces and said fixed locating surface in order to forcibly urge at least a portion of said movable jaw generally laterally inwardly against said resilient lateral biasing means and to take up at least a portion of said lateral clearance on a laterally inward side of said guide portion when the item is forcibly clamped between said jaws, the clamping engagement of said movable jaw with the item tending to also forcibly urge the item laterally inwardly against said fixed locating surface.

3. A clamping device according to claim 2, wherein said guide portion includes a guide portion opening extending generally longitudinally therethrough, said clamping means including a threaded rod extending longitudinally through said guide portion opening, and a retainer member received in said bore opening, said retainer member being in threaded engagement with said threaded rod, and means for restraining said retainer member from rotational and longitudinal movement relative to said body, said threaded rod having an enlarged portion longitudinally engaging said guide portion in order to forcibly urge said movable jaw toward said fixed jaw in response to rotation of said threaded rod in a first direction in order to actuate said clamping means.

4. A clamping device according to claim 3, wherein said guide portion opening is laterally larger than said threaded rod in order to accommodate lateral movement of said guide portion within said body opening.

5. A clamping device according to claim 3, wherein said body has a generally rectangular recessed portion defining a shoulder portion generally surrounding one end of said body opening, said retainer member having a generally complementary rectangular head portion received in said rectangular recessed portion and longitudinally abutting said shoulder portion for rotationally and longitudinally restraining said retainer member relative to said body.

6. A clamping device according to claim 3, further including resilient longitudinal biasing means between said guide portion and said retainer member for resiliently biasing said guide portion in a generally longitudinal direction away from said retainer member in order to resiliently urge said movable jaw away from said fixed jaw when said threaded rod is rotated in a second opposite direction in order to deactuate said clamping means.

7. A clamping device according to claim 2, further including a pin member fixed relative to said body and protruding laterally inwardly into said body opening, said guide portion having a longitudinally elongated slot formed therein, said slot slidably receiving said pin therein in order to allow longitudinal movement of said guide portion in said body opening while restricting rotational movement of said guide portion in said body opening.

8. A clamping device according to claim 1, wherein at least a portion of said movable jaw surface is tapered in a direction generally laterally inwardly and longitudinally away from said fixed jaw, said tapered portion of said movable jaw surface accommodating said laterally inward movement of at least a portion of said guide portion when the item is forcibly clamped between said jaws.

9. A clamping device according to claim 2, wherein said resilient lateral biasing means is located at a longitudinal position spaced longitudinally away from the longitudinal position of said fixed jaw surface in a longitudinal direction toward said movable jaw.

10. A clamping device for clamping an item at a predetermined location relative to a predetermined surface, said clamping device comprising:

a body including securing means for securing said clamping device to said predetermined surface at a fixed location thereon;

a fixed jaw being fixed relative to said body and having a generally laterally-extending fixed jaw surface thereon;

a movable jaw selectively movable toward and away from said fixed jaw and having a generally laterally-extending movable jaw surface thereon, said movable and fixed jaws being adapted to receive the item inserted therebetween;

a locating surface fixed relative to said body, said locating surface extending transversely at a laterally rearward position relative to said jaw surfaces, said locating surface being engageable by the item when the item is inserted between said jaw surfaces;

resilient biasing means for resiliently biasing at least a portion of said movable jaw in a generally laterally forward direction relative to said body;

clamping means located laterally rearward of said locating surface and being selectively actuable for forcibly urging said movable jaw toward said fixed jaw in order to forcibly clamp the item between said jaws, said clamping means exerting a clamping force on said movable jaw at a generally laterally rearward position relative to said locating surface in order to forcibly urge at least a portion of said movable jaw laterally rearwardly as the item is forcibly clamped between said jaws, the forcible clamping engagement of said movable jaw with the clamped item tending to forcibly urge the item rearwardly against said locating surface as said movable jaw is forcibly urged laterally rearwardly, thereby accurately locating the clamped item at a predetermined location relative to the predetermined surface, said body including a body opening extending therethrough at a lateral position rearward of said locating surface, a portion of said movable jaw being slidably received within said body opening for said movement toward and away from said fixed jaw, said resilient biasing means including a spring-loaded plunger extending laterally into said body opening in slidable engagement with said portion of said movable jaw and resiliently biasing said portion of said movable jaw laterally forward.

11. A clamping device according to claim 10, wherein said clamping means includes a threaded rod extending through said body opening, and a threaded retainer member threadably engaging said threaded rod, said threaded rod having an enlarged head portion abuttingly engaging said movable jaw, and said retainer member having an enlarged retainer portion abutting a portion of said body and being rotationally restrained thereby, rotation of said threaded rod in a first direction forcibly urging said movable jaw toward said fixed jaw and into forcible clamping engagement with the item, continued rotation of said threaded rod in said first direction after engagement of said movable jaw with the item tending to forcibly urge said portion of said movable jaw laterally rearward in order to also forcibly urge the clamped item laterally rearward against said locating surface.

12. A clamping device according to claim 11, wherein said body opening is laterally larger than said portion of said movable jaw portion received therein in order to accommodate said lateral movement of said portion of said movable jaw therein.

13. A clamping device according to claim 12, further including second resilient biasing means for resiliently biasing said movable jaw away from said fixed jaw in order to separate said jaws when said clamping means is deactuated to release the clamped item.

14. A clamping device according to claim 13, further including means for rotationally restraining said portion of said movable jaw relative to said body opening in order to maintain said jaws in a mutually aligned relationship with one another.

15. A clamping device according to claim 10, wherein said resilient biasing means is selectively deactuable.

16. A clamping device according to claim 10, wherein at least a portion of said movable jaw surface is chamfered in a direction generally rearward and away from said fixed jaw surface, said chamfered portion accommodating said laterally rearward movement of said portion of said movable jaw.

17. A clamping device for clamping an item at a predetermined location relative to a predetermined surface, said clamping device comprising:

- a body including securing means for securing said clamping device to said predetermined surface at a fixed location thereon;
- a fixed jaw being fixed relative to said body and having a generally laterally-extending fixed jaw surface thereon;
- a movable jaw selectively movable toward and away from said fixed jaw and having a generally laterally-extending movable jaw surface thereon, said movable and fixed jaws being adapted to receive the item inserted therebetween;
- a locating surface fixed relative to said body, said locating surface extending transversely at a laterally rearward position relative to said jaw surfaces, said locating surface being engageable by the item when the item is inserted between said jaw surfaces;
- resilient biasing means for resiliently biasing at least a portion of said movable jaw in a generally laterally forward direction relative to said body;
- clamping means located laterally rearward of said locating surface and being selectively actuable for forcibly urging said movable jaw toward said fixed jaw in order to forcibly clamp the item between said jaws, said clamping means exerting a clamping force on said movable jaw at a generally laterally rearward position relative to said locating surface in order to forcibly urge at least a portion of said movable jaw laterally rearwardly as the item is forcibly clamped between said jaws, the forcible clamping engagement of said movable jaw with the clamped item tending to forcibly urge the item rearwardly against said locating surface as said movable jaw is forcibly urged laterally rearwardly, thereby accurately locating the clamped item at a predetermined location relative to the predetermined surface, the predetermined surface including at least one keyway formed therein, said body including at least one keyway formed therein for receiving a key therein and means for fixedly securing said key in said keyway in said base body portion, said key also being receivable in said keyway in said predetermined surface.

18. A clamping device according to claim 10, wherein the predetermined surface is working surface of a machine apparatus, and the item is a workpiece upon which a machining operation is to be performed.

* * * * *

UNITED STATES PATENT AND TRADEMARK OFFICE

CERTIFICATE OF CORRECTION

PATENT NO. : 4,760,998

DATED : August 2, 1988

INVENTOR(S) : Dale Hitt

It is certified that error appears in the above-identified patent and that said Letters Patent is hereby corrected as shown below:

Column 6, line 66, claim 2, after "opening" insert --being--.

Signed and Sealed this

Twenty-seventh Day of December, 1988

*Attest:*

DONALD J. QUIGG

*Attesting Officer*

*Commissioner of Patents and Trademarks*